Dec. 15, 1959   H. E. HOGFORS   2,917,136
VEHICLE BRAKES
Filed May 8, 1957   3 Sheets-Sheet 1
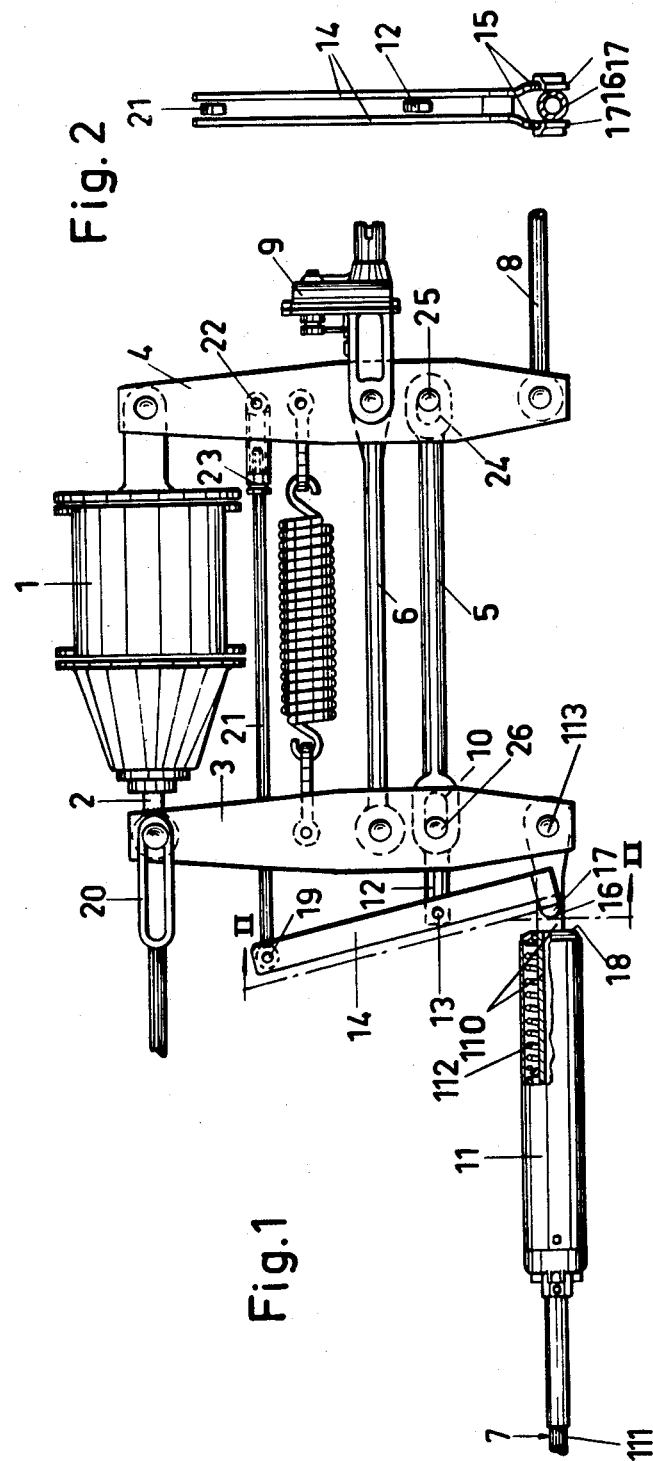

Dec. 15, 1959     H. E. HOGFORS     2,917,136
VEHICLE BRAKES
Filed May 8, 1957                                                      3 Sheets-Sheet 2
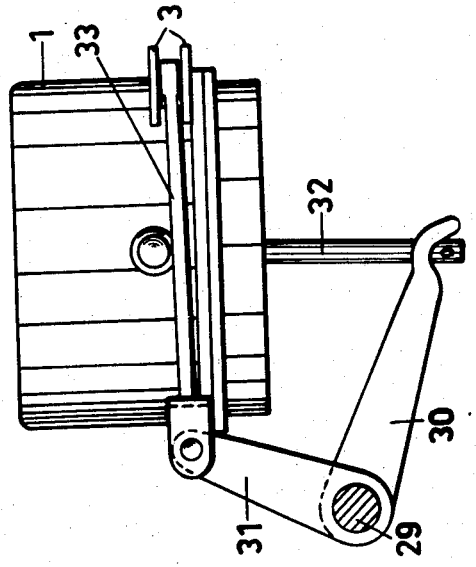
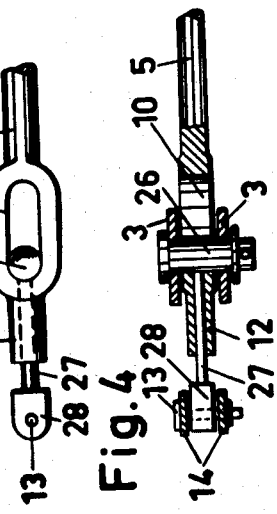
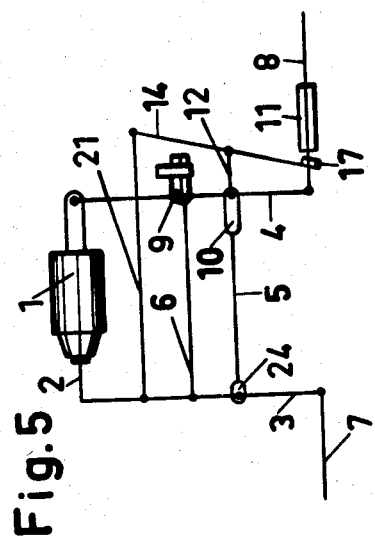

Dec. 15, 1959　　H. E. HOGFORS　　2,917,136
VEHICLE BRAKES
Filed May 8, 1957　　　　　　　　　　　　3 Sheets-Sheet 3
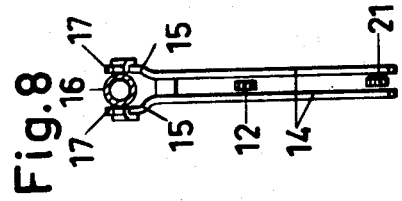
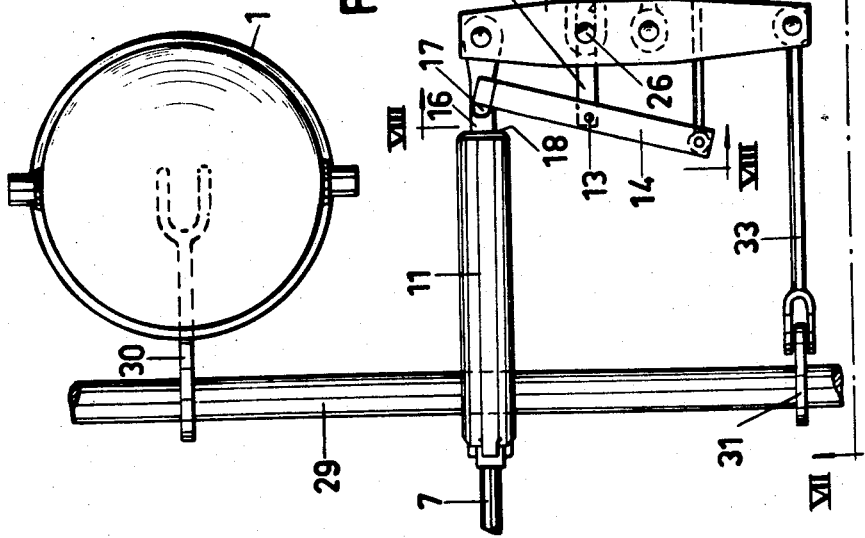

United States Patent Office 2,917,136
Patented Dec. 15, 1959

2,917,136

VEHICLE BRAKES

Henning Einar Hogfors, Malmo, Sweden, assignor to Svenska Aktiebolaget Bromsregulator, Malmo, Sweden, a corporation of Sweden Application May 8, 1957, Serial No. 657,800

Claims priority, application Great Britain May 29, 1956

10 Claims. (Cl. 188—195)

This invention relates to vehicle brakes and more particularly to brake apparatus for railway vehicles or the like in which the brake gear comprises different brake lever connecting links defining different brake applying leverages, namely a lower one for braking the vehicle when empty or loaded at the most up to a certain load weight, and a higher one for braking the vehicle when loaded above said certain load weight. Brake apparatus of the above character is commonly referred to as "Empty and Load" brake gear, and a preferred form is shown in U.S. Patent No. 2,081,660.

The present invention requires the use of a double-acting slack adjuster of the general type shown in U.S. Patents Nos. 2,035,228 and 2,767,811.

In most railway brake systems, operated by compressed air or by vacuum, it is desirable for a good performance of the brake system that the travel of the brake piston in the brake cylinder on braking remain approximately constant at all braking operations. But when using a brake gear of the empty and load type mentioned above, the brake piston travel will be different for the different brake applying leverages, if the brake slack is kept constant. The remedy thereagainst most used hitherto consists in so controlling the operation of the automatic slack adjuster that when braking with the higher brake applying leverage, the slack adjuster will keep the brake slack at a value giving a desired value of the brake piston travel, and in obtaining about the same desired value of the brake piston travel when braking with the lower brake applying leverage, by providing the brake lever connection of the link defining the lower brake applying leverage with extra lost motion.

One known manner in which this result can be achieved consists in providing the link defining the lower brake applying leverage with means to allow for adjustment of the extra lost motion of the link. This adjustment has to be performed separately on each vehicle, and for making this adjustment correctly, considerable skill and labour is required. In practice there is the risk of the adjustment on one vehicle or another being made incorrectly with the result that the brake apparatus on the respective vehicle may fail to function in the intended manner. If, as may happen, the extra lost motion on a vehicle is made too great, the result may be that on braking with the brake setting mechanism on the vehicle in the position "Empty," the activation of the link defining the lower brake applying leverage will be too much delayed, so that the link defining the higher brake applying leverage remains in action not only during the consumption of the brake slack but also at the following development of braking power. This involves the risk of sliding the wheels.

In order to avoid said difficulties and risks involved in an adjustment, separately on each vehicle, of the lost motion of the link defining the lower brake applying leverage, it has been suggested to dispense with the means allowing for this adjustment and to give the extra lost motion a fixed value which can be used unchanged on each vehicle and which, while sufficiently great to allow for unobstructed shifting of the movable abutment into and out of operative position, is sufficiently small to eliminate any risk for the link defining the lower brake applying leverage not coming into action on braking with the brake setting mechanism in the position "Empty." But this suggestion is practicable only on the condition that other means can be provided for complying with the requirement for approximately the same travel of the brake piston in the brake cylinder when braking with either of the two different brake applying leverages.

It is an object of the invention to comply with this requirement by means of a double-acting automatic slack adjuster of the kind mentioned above, and by controlling the operation of this slack adjuster in a special manner.

It also has been proposed to control the operation of a double-acting automatic slack adjuster in such a manner (see U.S. Patent No. 1,864,636) that, after changing from one to another of available different brake applying leverages, the slack adjuster automatically changes the slack so that the brake piston travel necessary for consuming the slack and applying the brake shoes against the wheels will be the same for the different brake applying leverages. But this is not sufficient for avoiding a material difference in the total brake piston travel on full braking with one or the other of the different brake applying leverages, because said total brake piston travel comprises not only the part thereof necessary for consuming the slack and applying the brake shoes against the wheels, but also the additional part corresponding to the elastic deflection of the brake gear under braking stress. This latter part is materially different for the different brake applying leverages, and for this reason the prior proposal just referred to does not lend itself to a complete equalization of the brake piston travels on full braking with one or the other of the different brake applying leverages.

In the present invention use is made of a double-acting slack adjuster automatically adjusting the slack to different values according as one or the other of the different brake applying leverages is in action when braking. In contrast to the prior art in which said different values of the slack are dependent upon each other because of both being governed by the same constant length of the brake piston travel needed for consuming the slack and applying the brake shoes against the wheels on braking with either of the different brake applying leverages, the present invention contemplates an arrangement permitting each of said different values of the slack to be chosen independently of the other within reasonable limits.

For a full elucidation of the invention reference is made to the accompanying drawings in which:

Fig. 1 is a plan view of part of a conventional compressed air brake gear equipped with a double-acting automatic slack adjuster of the kind prescribed above, and with a preferred embodiment of the form of control gear contemplated by the invention.

Fig. 2 is a side view, partly in section, on line II—II of Fig. 1.

Figs. 3 and 4 are a detail plan view and a corresponding sectional view, respectively, of a modification.

Fig. 5 is a diagrammatic plan view of the brake gear and illustrates a modified disposition of the slack adjuster and the control gear for the same.

Fig. 6 is a plan view of part of a vacuum brake gear and illustrates how the invention may be applied thereto.

Fig. 7 is a side view, partly in section, on line VII—VII in Fig. 6.

Fig. 8 is a section on line VIII—VIII in Fig. 6.

Fig. 1 shows a compressed air brake cylinder 1 of conventional type having a push rod 2 operated by the piston in the cylinder, and a pair of equalizing brake levers 3 and 4 interconnected at different points defining different brake applying leverages by tie rods 5 and 6. The brake lever 3 is pivoted at one end to the push rod 2, and the other brake lever 4 is fulcrumed at one end to a fulcrum bracket on the brake cylinder. To the other ends of the brake levers 3 and 4 are connected the main brake pull rods 7 and 8, respectively, extending to the brake equipments including the brake shoes for coaction with the wheels at the two ends of the vehicle. The tie rod 5 defines the higher brake applying leverage which is to be used when the vehicle is loaded above a certain load weight, and the tie rod 6 defines the lower brake applying leverage which is to be used when the vehicle is empty or loaded at the most up to said load weight. The tie rod 6 is provided with a so-called empty and load box 9 comprising a casing which is pivotally connected to the brake lever 4 in the same point as the tie rod 6 and houses an abutment which is movable into and out of operative position in which it diminishes a lost motion provided for in the connection of the tie rod 6 to the brake lever 4. When said movable abutment is out of operative position, said lost motion is sufficient for setting the tie rod 6 out of action and thereby setting the tie rod 5 into action during application of the brake. The load gear 9 may be of any suitable type and preferably of the type disclosed in the U.S. Patent No. 2,081,660. As shown therein it is known to provide the tie rod 5 with a slot 10 for not subjecting it to thrust on braking with the tie rod 6 in action.

The main brake pull rod 7 consists or is formed in part of a double-acting slack adjuster with a two-part brake rod comprising two rod parts 110 and 111 which are axially adjustable in relation to one another under the control of an operating member 11 which is axially movable on the two-part brake rod. A spring 112 disposed between the first part 110 of the two-part brake rod and the operating member 11 urges the latter into a normal axial end position in relation to the first part 110 of the two-part brake rod towards the connection 113 thereof with the brake lever. In these respects the slack adjuster may be of any suitable construction, for instance as shown in the already mentioned U.S. Patents Nos. 2,035,228 and 2,767,811.

There is a control gear for moving the operating member 11 against the spring pressure thereon under the control of the movement which is imparted to the brake lever 3 by the push rod 2 on application of the brake. This control gear is constructed as follows. At its end connected to the brake lever 3 the tie rod 5 is provided with an extension 12, and a pivot pin 13 connects with the projecting end of the extension 12 a follower lever 14 at a point between the ends thereof. One end of this follower lever 14 is bifurcated as shown at 15 in Fig. 2 and straddles the first part 16 of the two-part brake rod 7 between its connection with the cylinder lever 3 and the operating member 11 and is provided with means 17 forming an abutment for coaction with the facing end 18 of the operating member 11. At its other end the follower lever 14 is fulcrumed by a pin 19 to an anchoring means so that at fully released brake there is between the abutment 17 and the facing end 18 of the operating member 11 a distance or lost motion corresponding to the brake slack desired when braking with the tie rod 5 defining the higher brake applying leverage in action.

The anchoring means for the fulcrum 19 of the follower lever 14 may be of any suitable construction. It may consist of a link connecting the fulcrum pin 19 to a fixed point on the under-frame of the vehicle. But if using such a connecting link for the anchoring of the fulcrum 19 it must be taken into account that an alteration in angular position of the two brake levers 3 and 4 in relation to the axis of the brake cylinder at released brake, such as will be caused with time by the wear of the brake shoes and the corresponding shortening of the slack adjuster brake rod 7, will alter the distance between the abutment 17 and the facing end 18 of the operating member 11 of the slack adjuster, unless the point 13 in which the follower lever 14 is tied to the brake lever 3, divides the follower lever with a ratio between the parts (arm lengths) equal to the ratio of the arm lengths into which the brake lever 3 is divided by its point of connection to the tie rod 5. But then, if the extension 12 is in alignment with the tie rod 5, the fulcrum 19 will come on the extended axis of the brake cylinder 1, which often would cause interference with the usual hand brake connection 20. For avoiding such interference it would be desired to shorten the follower lever 14, but for maintaining the same ratio between the arm lengths of the follower lever it would then be necessary to offset the extension 12 angularly more or less from the axis of the tie rod 5, and moreover the angle between the extension 12 and the tie rod 5 would have to be made different on different vehicle types with different requirements for braking power in the "Load" position and consequent different dispositions of the tie rod 5 defining the higher brake applying leverage. In order to make it possible to use a follower lever 14 considerably shorter than the cylinder lever 3 and, nevertheless, to make use on each vehicle of a standardized tie rod 5 with aligned extension 12, the anchoring of the fulcrum 19 may be made as shown in the drawing, namely by means of a link rod 21 extending freely through the brake lever 3 (which as usual is composed of two parallel plates leaving a space between them) to a point 22 on the fulcrumed brake lever 4. When the brake levers 3 and 4 are of the same length, the point 22 has to be at substantially the same distance as the fulcrum point 19 from the axis of the brake cylinder. The link rod 21 may be provided with a screw connection 23 for adjusting the length of the rod and thereby the distance between the abutment 17 and the facing end 18 of the operating member 11 of the slack adjuster at released brake.

In order that the control gear comprising the follower lever 14 shall operate in the manner contemplated by the invention, the follower lever 14 must have a certain lost motion in relation to the brake levers 3 and 4 axially of the slack adjuster when braking with the "Empty" rod 6 in action, but not when braking with the "Load" rod 5 in action. In the embodiment shown this lost motion is provided for in the connection of the tie rod 5 to the brake lever 4, in that the tie rod 5 has a slot 24 of suitable disposition and length for the pin 25 connecting the tie rod 5 to the brake lever 4. In released position of the brake this slot 24 extends inwardly from the pin 25. When braking with the higher brake applying leverage in action, the tie rod 5 is stressed and its connection pins 25 and 26 are in the outer ends of the respective slots 24 and 10, so that these slots do not influence the operation of the brake gear, nor the operation of the control gear for the slack adjuster. On the other hand, when braking with the "Empty" rod 6 in action, the connection pin 26 moves inwardly in the slot 10, and so the tie rod 5 and its extension 12 can form no firm support for the pivot 13 until the ends of the brake levers 3, 4 remote from the brake cylinder have been moved so far towards each other, and/or the tie rod 5 has been bodily displaced so far to the right in Fig. 1 (by the follower lever 14 being acted upon by the spring-pressed operating member 11), that the connection pin 25 is in the inner end of the slot 24. It is evident that the length of the slot 24 defines the extent of an increase of the distance or lost motion between the abutment 17 and the facing end 18 of the operating member 11, occurring only when braking with the "Empty" tie rod 6 in action. Since the distance or lost motion between the abutment 17 and the facing end 18 of the operating member 11 governs the extent of the slack adjusting movement being imparted to the slack adjuster, it is evident that any desired paying out of slack for increasing the otherwise too short brake piston travel on braking with the tie rod 6 in action, can be obtained by appropriate selection of the length of the lost motion which in the embodiment shown in Fig. 1 is provided for by means of the slot 24.

It should be observed that in Fig. 1 the brake levers 3 and 4 are shown to be parallel in released position of the brake. This unusual disposition of the brake levers is preferred because of giving many practical advantages, one of which is that each of the tie rods 5 and 6 can be of a standardized length irrespective of varying divisions of the brake levers by the tie rods to obtain varying values of the brake applying leverages, as may be required for different vehicle types.

The invention is not limited to the constructional embodiment shown in Figs. 1 and 2 and described in detail above, for many modifications can be made without departing from the principal features of the invention as defined in appended claims. Some examples of modifications are shown in Figs. 3 to 5. Figs. 3 and 4 show how a lost motion connection of the pivot pin 13 to the connection pin 26 of the tie rod 5 can be substituted for the slot 24. The pivot pins 13 and 26 are interconnected by means of a rod 27 sliding in an axial bore in the extension 12 and thrusting with its inner end against the pin 26. At its projecting outer end the rod 27 has a head 28 through which the pin 13 passes, and the lost motion is provided for in the form of a play between the head 28 and the outer end of the extension 12.

Fig. 5 shows how the slack adjuster can be disposed in the brake pull rod 8 connected to the fulcrumed brake lever 4.

Figs. 6 to 8 show, by way of an example, how the invention may be applied to the brake gear of brakes operated by vacuum. In this case the braking power is transmitted from the brake cylinder 1 to one end of the brake lever 3 by means of a shaft 29 rotatably mounted on the under-frame of the vehicle and provided with two arms 30 and 31, the arm 30 being acted upon by the brake piston rod 32, and the arm 31 being connected with said end of the lever 3 by means of a link 33. The interconnections of the two equalizing brake levers 3 and 4 for obtaining different brake applying leverages, the arrangement of the double-acting automatic slack adjuster with the axially movable spring-pressed operating member 11, and the arrangement of the control gear for the slack adjuster are substantially as described with reference to Fig. 1.

What I claim is:
1. In brake apparatus for railway vehicles and the like, the combination comprising a brake lever, first and second connecting links connected to said brake lever at spaced points therealong and adapted to be made operative selectively for respectively a higher and a lower brake applying leverage, each said link being connected adjacent the end thereof remote from said brake lever to a common anchoring structure, said apparatus having a double-acting brake slack adjuster comprising a two-part brake rod, the first part thereof being connected to said brake lever, an operating member movable axially on said two-part brake rod for adjusting the effective length thereof, and spring means between said first part and said operating member urging them into a normal axial end position in relation to one another, and a control gear for moving said operating member axially on said brake rod against the action of said spring means, which control gear comprises a follower lever, a link connecting one end thereof to said anchoring structure, an abutment on the other end of said follower lever adapted to coact with said operating member, and means comprising said first connecting link connecting said follower lever at a point between the ends thereof with said anchoring structure, said last-named means including a lost motion connection providing a certain lost motion of said last-named point axially of said first connecting link in relation to said anchoring structure, said lost motion taking place exclusively when said second connecting link is operative to give the lower brake applying leverage.

2. The combination claimed in claim 1, in which said first connecting link has an extension beyond its point of connection with said brake lever, and in which said follower lever is pivotally connected at said point between the ends thereof with said extension and carried thereby.

3. The combination claimed in claim 2 wherein said follower lever is pivoted at said point between the ends thereof to the outer end of said extension and in which pins connecting said first connecting link respectively to said brake lever and said anchoring structure are movable in axially extending slots in said first connecting link and are in the outer ends of said slots on braking when said first connecting link is made operative to give the higher brake applying leverage, the slot for the pin connecting said first connecting link to said anchoring structure giving a certain lost motion of said follower lever axially of said first connecting link in relation to said anchoring structure on braking exclusively when said second connecting link is operative to give the lower brake applying leverage.

4. The combustion claimed in claim 2, in which a member to which said follower lever is pivoted at said point between the ends thereof is carried by said extension and is axially movable in relation thereto so as to give a certain lost motion of said follower lever axially of said extension in relation to said brake lever on braking exclusively when the lower brake applying leverage is operative.

5. The combination claimed in claim 4, in which a pin connects said brake lever to said first connecting link and is movable in an axial slot therein, and in which said member to which said follower lever is pivoted comprises a rod slidable in an axial bore extending through said extension from the outer end thereof to said slot, said rod thrusting with its inner end against said pin in said slot and having at its projecting outer end a head to which said follower lever is pivoted at said point between the ends thereof, said certain lost motion of said follower lever axially of said one connecting link in relation to said brake lever being provided for by an axial play between said head of said sliding rod and said outer end of said extension.

6. In brake apparatus for railway vehicles and the like, the combination comprising first and second equalizing brake levers, first and second connecting links each connecting said levers at different respective points thereon and adapted to be made operative selectively for respectively a higher and a lower brake applying leverage, a double-acting brake slack adjuster comprising a two-part brake rod, the first part thereof being connected to said first brake lever, an operating member movable axially on said two-part brake rod for adjusting the effective length thereof, and spring means between said first part and said operating member urging them into a normal axial end position in relation to one another, and a control gear for moving said operating member axially on said brake rod against the action of said spring means, which control gear comprises a follower lever, a link connecting one end thereof to said second brake lever, an abutment on the other end of said follower lever adapted to coact with said operating member, and means comprising said first connecting link connecting said follower lever at a point between the ends thereof with said second brake lever, said last-named means including a lost motion connection providing a certain lost motion of said last-named point axially of said first connecting link in relation to said brake levers, said lost motion taking place exclusively when said second connecting link is operative to give the lower brake applying leverage.

7. The combination claimed in claim 6, in which said follower lever is disposed adjacent said first brake lever, said first connecting link has an extension beyond its point of connection with said first brake lever, and said follower lever is pivotally connected at said point between the ends thereof with said extension and carried thereby.

8. The combination claimed in claim 7, in which said follower lever is pivoted at said point between the ends thereof to the outer end of said extension, and in which pins connecting said brake levers to said first connecting link are movable in axially extending slots in said first connecting link and are in the outer ends of said slots on braking when said first connecting link is operative to give the higher brake applying leverage, the slot for the pin connecting said first connecting link to said second brake lever giving a certain lost motion of said follower lever axially of said first connecting link in relation to said second brake lever on braking exclusively when said second connecting link is operative to give the lower brake applying leverage.

9. The combination claimed in claim 7, in which a member to which said follower lever is pivoted at said point between the ends thereof is carried by said extension and is axially movable in relation thereto so as to give a certain lost motion of said follower lever axially of said extension in relation to said first brake lever on braking exclusively when the lower brake applying leverage is operative.

10. The combination claimed in claim 7, in which a pin connects said first brake lever to said first connecting link and is movable in an axial slot therein, and in which said member to which said follower lever is pivoted comprises a rod slidable in an axial bore extending through said extension from the outer end thereof to said slot, said rod thrusting with its inner end against said pin in said slot and having at its projecting outer end a head to which said follower lever is pivoted at said point between the ends thereof, said certain lost motion of said follower lever axially of said first connecting link in relation to said first brake lever being provided for by an axial play between said head of said slidable rod and said outer end of said extension.

References Cited in the file of this patent
UNITED STATES PATENTS

| | | |
|---|---|---|
| 1,837,473 | Neveu | Dec. 22, 1931 |
| 2,369,543 | Diurson | Feb. 13, 1945 |
| 2,371,798 | Browall | Mar. 20, 1945 |